United States Patent
Yamada

(10) Patent No.: US 9,726,228 B2
(45) Date of Patent: Aug. 8, 2017

(54) CLUTCH WITH BACK TORQUE LIMITER

(71) Applicant: SUZUKI MOTOR CORPORATION, Hamamatsu-shi, Shizuoka (JP)

(72) Inventor: Ikuo Yamada, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 163 days.

(21) Appl. No.: 14/650,693

(22) PCT Filed: Jan. 29, 2015

(86) PCT No.: PCT/JP2015/052419
§ 371 (c)(1),
(2) Date: Jun. 9, 2015

(87) PCT Pub. No.: WO2015/119024
PCT Pub. Date: Aug. 13, 2015

(65) Prior Publication Data
US 2016/0281796 A1   Sep. 29, 2016

(30) Foreign Application Priority Data
Feb. 4, 2014 (JP) .................................. 2014-019615

(51) Int. Cl.
| | | |
|---|---|---|
| F16D 13/56 | (2006.01) | |
| F16D 13/54 | (2006.01) | |
| F16D 43/12 | (2006.01) | |

(52) U.S. Cl.
CPC ............. *F16D 13/56* (2013.01); *F16D 13/54* (2013.01); *F16D 43/12* (2013.01); *F16D 2013/565* (2013.01)

(58) Field of Classification Search
CPC ..... F16D 13/54; F16D 13/56; F16D 2013/565
See application file for complete search history.

(56) References Cited

U.S. PATENT DOCUMENTS

| | | | | |
|---|---|---|---|---|
| 2015/0001028 | A1* | 1/2015 | Yoshimoto | F16D 13/52 |
| | | | | 192/70.23 |
| 2015/0114784 | A1* | 4/2015 | Sakuyama | F16D 13/56 |
| | | | | 192/54.5 |

FOREIGN PATENT DOCUMENTS

| | | |
|---|---|---|
| EP | 2827016 A1 | 1/2015 |
| EP | 2881607 A2 | 6/2015 |

(Continued)

OTHER PUBLICATIONS

International Search Report issued in International Patent Application Serial No. PCT/JP2015/052419.

(Continued)

*Primary Examiner* — Jacob S Scott
(74) *Attorney, Agent, or Firm* — Troutman Sanders LLP

(57) ABSTRACT

A clutch (3) includes: a clutch housing (32) which is provided with a drive plate (33) to be movable in an axial direction; a clutch hub (34) which transmits a rotary motive power to an output shaft; a clutch sleeve (35) which is provided with a driven plate (36) to be movable in the axial direction; and a pressure disk (40) which biases the drive plate (33) and the driven plate (36) toward the clutch hub (34), further includes a back torque limiter (7) which moves the pressure disk (40) in a direction away from the clutch hub (34) when back torque is applied, and the clutch hub (34) is provided with a restricting apparatus which restricts movement of the pressure disk (40) in the direction away from the clutch hub (34) when a number of rotations of the output shaft is less than a predetermined value.

4 Claims, 10 Drawing Sheets

(56) References Cited

FOREIGN PATENT DOCUMENTS

| JP | H08128462 A | 5/1996 |
|----|-------------|--------|
| JP | 2001050294 A | 2/2001 |
| JP | 3703444 B2 | 10/2005 |
| JP | 2012172799 A | 9/2012 |
| JP | 2013044422 A | 3/2013 |
| WO | 2013137413 A1 | 9/2013 |

OTHER PUBLICATIONS

Extended European Search Report dated Apr. 6, 2016, issued in corresponding Application No. 15723112.7.

* cited by examiner

CLUTCH WITH BACK TORQUE LIMITER

CROSS REFERENCE TO RELATED APPLICATIONS

The present application is the U.S. National Phase of International patent application Ser. No. PCT/JP2015/052419, filed Jan. 29, 2015, which claims priority to Japanese Patent Application Serial No. 2014-019615, filed Feb. 4, 2014. The contents of the foregoing applications are hereby incorporated by reference in their entireties.

TECHNICAL FIELD

The present invention relates to a clutch with a back torque limiter. In particular, the present invention relates to a clutch with a back torque limiter, which is a clutch for four-wheeled vehicles and motorcycles and prevents excessive back torque from being applied from a driving wheel side to an engine side.

BACKGROUND ART

In a motorcycle, when excessive back torque is applied from a rear wheel (driving wheel) side to an engine side at shift-down time, the rear wheel is sometimes locked to make the behavior of a vehicle body unstable. Hence, some clutches have a back torque limiter to prevent excessive back torque from being applied from the rear wheel side to the engine side in such a case. The back torque limiter relatively slides a drive plate and a driven plate (establishing a half clutch state) when large back torque is applied, to thereby prevent the rear wheel being locked. However, in a structure in which the half clutch state is always established when large back torque is applied, torque cannot be sufficiently transmitted from the rear wheel to the engine, so that the engine cannot be started, for example, by push starting from a vehicle stop state.

Hence, Patent Literatures 1 and 2 disclose clutches each having a back torque limiter that can reduce back torque during running and transmit the back torque to the engine at the push starting. In the clutch described in Patent Literature 1, a governor plate that switches whether to operate the back torque limiter is provided at a pressure disk that presses a drive plate and a driven plate in an axial direction. Further, in the clutch described in Patent Literature 2, a limiter cancel mechanism that prevents the back torque limiter from operating under a predetermined condition is provided on a tip side of the clutch.

However, in the structure described in Patent Literature 1, a movable component is sandwiched between parts that decide the timing and amount of sliding of the clutch when the back torque limiter operates. Therefore, the structure has a problem of difficult dimension management of components. Further, since the movable component is structured to be provided at the pressure disk, the axial dimension of the clutch increases. On the other hand, the structure described in Patent Literature 2 is a structure in which a lock mechanism is provided at the tip side of the clutch (on a side far from a primary driven gear) and therefore has a problem of a counter shaft being prone to runout.

CITATION LIST

Patent Literature

Patent Literature 1: Japanese Laid-open Patent Publication No. 2013-44422

Patent Literature 2: Japanese Laid-open Patent Publication No. 08-128462

SUMMARY OF INVENTION

Technical Problem

In consideration of the above circumstances, a problem to be solved by the present invention is to simplify a structure of a clutch with a back torque limiter and suppress runout of a counter shaft (an output shaft of the clutch).

Solution to Problem

To solve the problem, the present invention is a clutch with a back torque limiter, the clutch including: a housing which is provided with a drive plate to be movable in an axial direction and to which a rotary motive power is transmitted from a driving force source; a hub which transmits the rotary motive power to an output shaft; a sleeve which is provided with a driven plate to be movable in the axial direction and which transmits the rotary motive power from the housing to the hub when the driven plate is pressed against the drive plate; and a pressure disk which is movable in the axial direction and biases the drive plate and the driven plate toward the hub, and further including: a back torque limiter which separates the pressure disk from the hub when back torque is applied from the output shaft; and a restricting apparatus which restricts movement of the pressure disk in a direction away from the hub when a number of rotations of the output shaft is less than a predetermined value, wherein the restricting apparatus is provided on the hub.

It is preferable that: the hub and the sleeve are relatively movable in a rotation direction and the axial direction; the hub and the sleeve relatively move in the rotation direction when the back torque is applied from the output shaft; and the back torque limiter moves the sleeve in the direction away from the hub according to the relative movement in the rotation direction of the hub and the sleeve, and brings the sleeve into abutment against the pressure disk to press the pressure disk to thereby move the pressure disk in the direction away from the hub.

It is preferable that: the hub is provided with a stopper which restricts the movement in the rotation direction relative to the sleeve; the sleeve is provided with an abutment part which abuts against the stopper when the sleeve rotates in the rotation direction relative to the hub, with a clearance in the rotation direction intervening between the abutment part and the stopper; the hub and the sleeve try to relatively rotate in a direction in which the clearance between the stopper and the abutment part decreases when the back torque is applied from the output shaft; and the restricting apparatus includes a restricting member which restricts, when a part thereof enters the clearance, the relative movement in the rotation direction of the hub and the sleeve.

It is preferable that the part of the restricting member enters the clearance when the number of rotations of the output shaft is less than the predetermined value, and gets out of the clearance when the number of rotations of the output shaft is the predetermined value or more.

It is preferable that the restricting member switches between a state that the part thereof enters the clearance and a state that the part thereof gets out of the clearance, depending on a centrifugal force generated by rotation of the hub.

It is preferable that the restricting member is rotatably provided on the stopper.

Advantageous Effects of Invention

According to the present invention, it is possible to simplify a structure of a clutch with a back torque limiter. It is also possible to provide a restricting apparatus at a position closer to a center from an end portion of an output shaft and thereby suppress runout of the output shaft due to the mass of the restricting apparatus.

DESCRIPTION OF EMBODIMENTS

Figure 1:
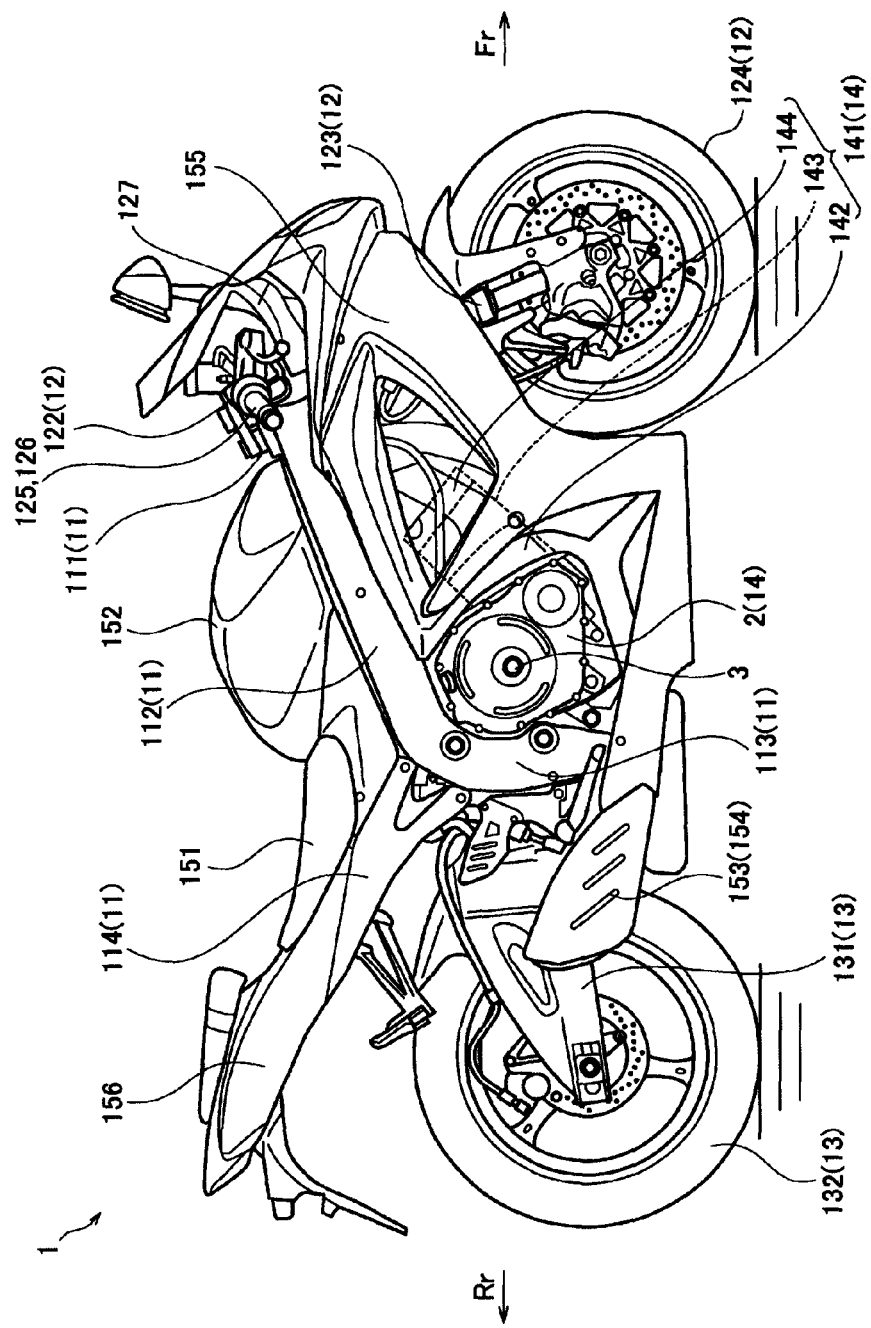
FIG. 1 is a right side view schematically illustrating an example of a structure of a motorcycle.

Hereinafter, an embodiment of the present invention will be described in detail referring to the drawings. In the embodiment of the present invention, a structure in which a clutch with a back torque limiter is applied to a motorcycle is illustrated as an example. For convenience of the description, directions of "front", "rear", "up", "down", "right", "left" of the motorcycle are based on a direction of a rider riding on the motorcycle. This also applies to a clutch incorporated in the motorcycle. In the drawings, a front side of the motorcycle is indicated by an arrow "Fr", a rear side is indicated by an arrow "Rr", a right side is indicated by an arrow "R", and a left side is indicated by an arrow "L". Further, in the drawings, an outside in a vehicle width direction is described as "OUT" and a center side in the vehicle width direction is described as "IN" in some cases.

(Whole Structure of Motorcycle)

First, the whole structure of a motorcycle 1 will be described referring to FIG. 1. FIG. 1 is a right side view schematically illustrating an example of the structure of the motorcycle 1. As illustrated in FIG. 1, the motorcycle 1 includes a vehicle body frame 11, a steering gear 12, a rear wheel suspension system 13, and an engine unit 14. Further, the engine unit 14 is provided with a clutch 3. The clutch 3 has a back torque limiter 7 (later described).

The vehicle body frame 11 includes a head pipe 111, a pair of right and left main frames 112, a pair of right and left pivot brackets 113, and a pair of right and left rear frames 114. The head pipe 111 is formed in a tubular shape declining rearward, and rotatably supports a steering shaft (hidden and not seen in the drawings) of the steering gear 12. The pair of right and left main frames 112 extend from a rear portion of the head pipe 111 toward the rear obliquely lower right and the rear obliquely lower left respectively. The pair of right and left pivot brackets 113 are provided at the rear of the pair of right and left main frames 112. The pair of right and left rear frames 114 extend rear obliquely upward from rear portions of the pair of right and left main frames 112 or the pair of right and left pivot brackets 113.

The steering gear 12 includes the steering shaft, a handle bar 122, a pair of right and left front forks 123, and a front wheel 124. The steering gear 12 is rotatably arranged at a front portion of the vehicle body frame 11. The steering shaft is rotatably supported by the head pipe 111. The pair of right and left front forks 123 are arranged at the right and left of the steering shaft respectively. The front wheel 124 is rotatably supported at lower ends of the pair of right and left front forks 123. The handle bar 122 is provided at an upper end of the steering shaft. Further, the handle bar 122 has right and left handle grips 125. On the right handle grip 125, a throttle grip 126 and a brake lever 127 for the front wheel 124 are provided. On the left handle grip 125, a clutch lever for operating the clutch 3 is provided. In addition to them, on the handle bar 122, switches for operating lights, a horn and the like are provided.

The rear wheel suspension 13 includes a swing arm 131, a shock absorber (hidden and not seen in the drawings), and a rear wheel 132, and is provided, swingably in an up-and-down direction, at a rear side of the pivot brackets 113 of the vehicle body frame 11. A front end of the swing arm 131 is coupled to the pivot brackets 113 so as to be swingable in the up-and-down direction. The shock absorber is provided between the swing arm 131 and the vehicle body frame 11, and absorbs and relaxes the vibration and impact transmitted from the swing arm 131 to the vehicle body frame 11. The rear wheel 132 is rotatably supported on a rear end of the swing arm 131. On the left side of the rear wheel 132, a driven chain sprocket is provided which rotates integrally therewith. Further, a chain is wound around a drive chain sprocket of the engine unit 14 and the driven chain sprocket of the rear wheel 132 which are coupled to each other to be able to transmit a rotary motive power.

The engine unit 14 is provided on a lower side of the main frames 112. The engine unit 14 is constituted by including a cylinder assembly 141 and a crankcase assembly 2. The cylinder assembly 141 is constituted by including a cylinder block 142, a cylinder head 143, and a cylinder head cover 144. Inside the cylinder block 142, a combustion chamber is formed, and inside the combustion chamber, a piston is reciprocatably disposed. The piston is coupled to a crankshaft 211 (later described) by a connecting rod. The reciprocating motion of the piston is converted to a rotational motion and transmitted by the connecting rod to the crankshaft 211. The cylinder head 143 is provided on an upper portion of the cylinder block 142. The cylinder head 143 is provided with an intake port that supplies an air-fuel mixture for combustion to the combustion chamber, an exhaust port that discharges an exhaust gas from the combustion chamber, a valve driving device that opens and closes the intake port and the exhaust port, an ignition plug that ignites the mixture in the combustion chamber and so on. The cylinder head cover 144 is provided on an upper side of the cylinder head 143. Note that the structure of the crankcase assembly 2 will be described later.

In addition to the above, on an upper side of the rear frames 114, a seating seat 151 is provided via a seat rail. On the front side of the seating seat 151, a fuel tank 152 is provided. Further, the motorcycle 1 is provided with an exhaust device 154 that is constituted by including a muffler 153 and an exhaust pipe (hidden and not seen in FIG. 1). The muffler 153 is disposed at an obliquely rear of the engine unit 14 and beside the rear wheel 132. The exhaust pipe has one end portion connected to the exhaust port of the engine unit 14 and the other end portion connected to the muffler 153. Further, to an outside of the motorcycle 1, a front side cover 155 and a rear side cover 156 are attached.

(Structure of Crank Case Assembly)

Figure 2:
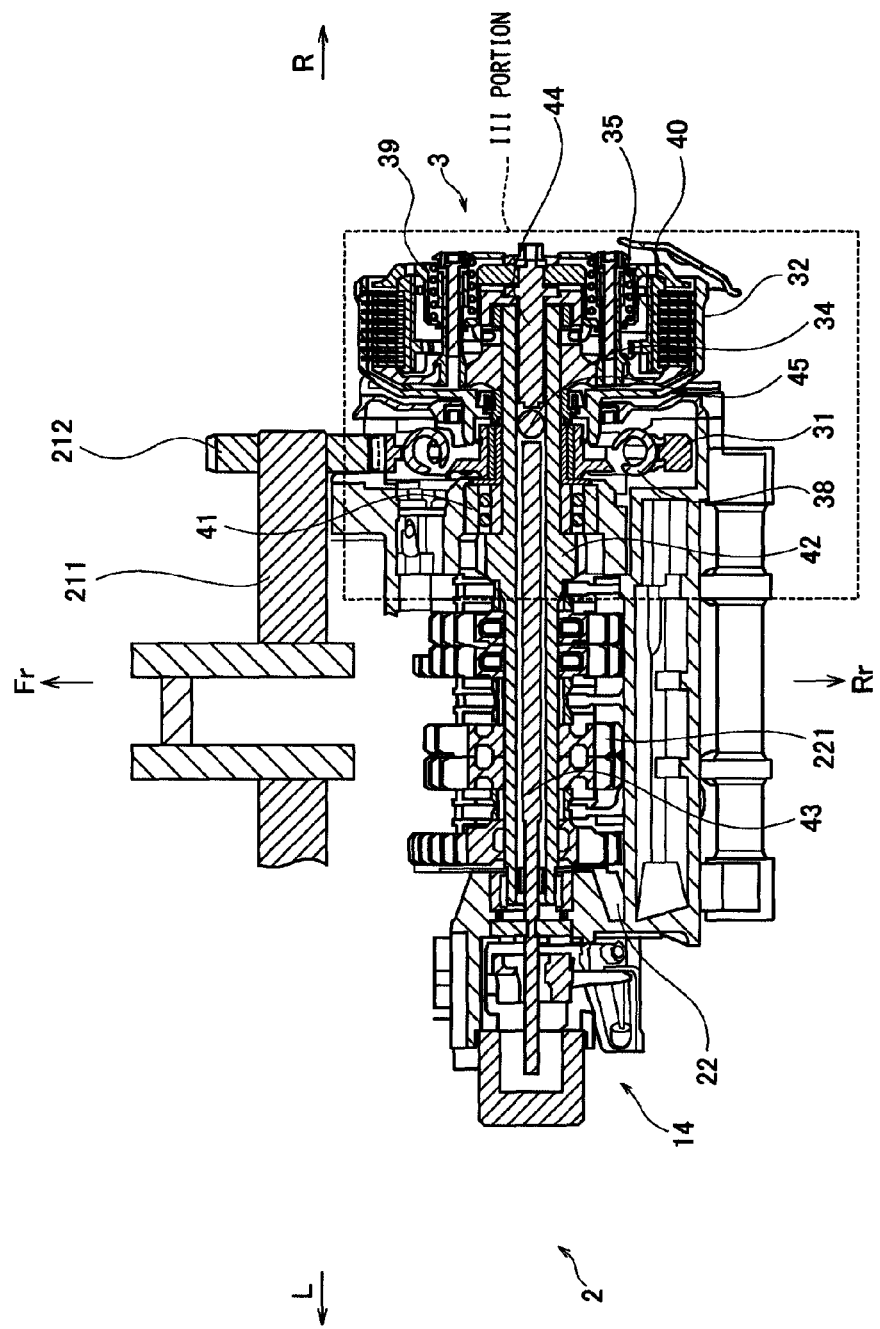
FIG. 2 is a cross-sectional view schematically illustrating an example of a structure of a crankcase assembly.

The structure of the crankcase assembly 2 is described here referring to FIG. 2. FIG. 2 is a cross-sectional view schematically illustrating an example of the structure of the crankcase assembly 2. Inside the crankcase assembly 2, a not-illustrated crank chamber is formed on a front side, and a transmission chamber 22 is formed on a rear side. On one side (the right side in the embodiment of the present invention) in the vehicle width direction of the crankcase assembly 2, the clutch 3 is provided. Inside the crank chamber, the crankshaft 211 is rotatably disposed. Inside the transmission chamber 22, a counter shaft 42 and a driven shaft (not illustrated) are disposed to be rotatable and in parallel with each other. The counter shaft 42 is rotatably supported by a bearing 41.

The crankshaft 211 is provided with a primary drive gear 212 so as to integrally rotate therewith. The primary drive gear 212 engages with a primary driven gear 31 of the clutch 3 and transmits the rotary motive power to the clutch 3. The clutch 3 connects and disconnects the rotary motive power between the crankshaft 211 and the counter shaft. As described above, in the embodiment of the present invention, the counter shaft 42 serves as an output shaft of the clutch 3. Further, a transmission 221 is structured to spread over the counter shaft 42 and the driven shaft. To the transmission 221, a conventionally-known regularly engaging-type transmission is applicable. One end (an end portion on the left side in the vehicle width direction in the embodiment of the present invention) of the driven shaft projects to the outside on the left side of a casing of the crankcase assembly 2. Further, to the projecting portion, the drive chain sprocket is provided so as to integrally rotate therewith. A drive chain is wound around the drive chain sprocket and the driven chain sprocket of the rear wheel 132.

As described above, the rotary motive power of the crankshaft 211 is transmitted to the rear wheel 132 via the clutch 3, the counter shaft 42, the driven shaft, and the drive chain. Contrarily, back torque from the rear wheel 132 is transmitted from the counter shaft 42 to the clutch 3.

In addition to the above, a magneto being a power generator and a magneto cover covering the magneto (both of them are not illustrated) are attached to the crankcase assembly 2 on an opposite side (the left side in the vehicle width direction) to the clutch 3. Furthermore, on the left side of the crankcase assembly 2, a starting device (not illustrated) is provided which starts the engine unit 14.

(Whole Structure of Clutch)

Figure 3:
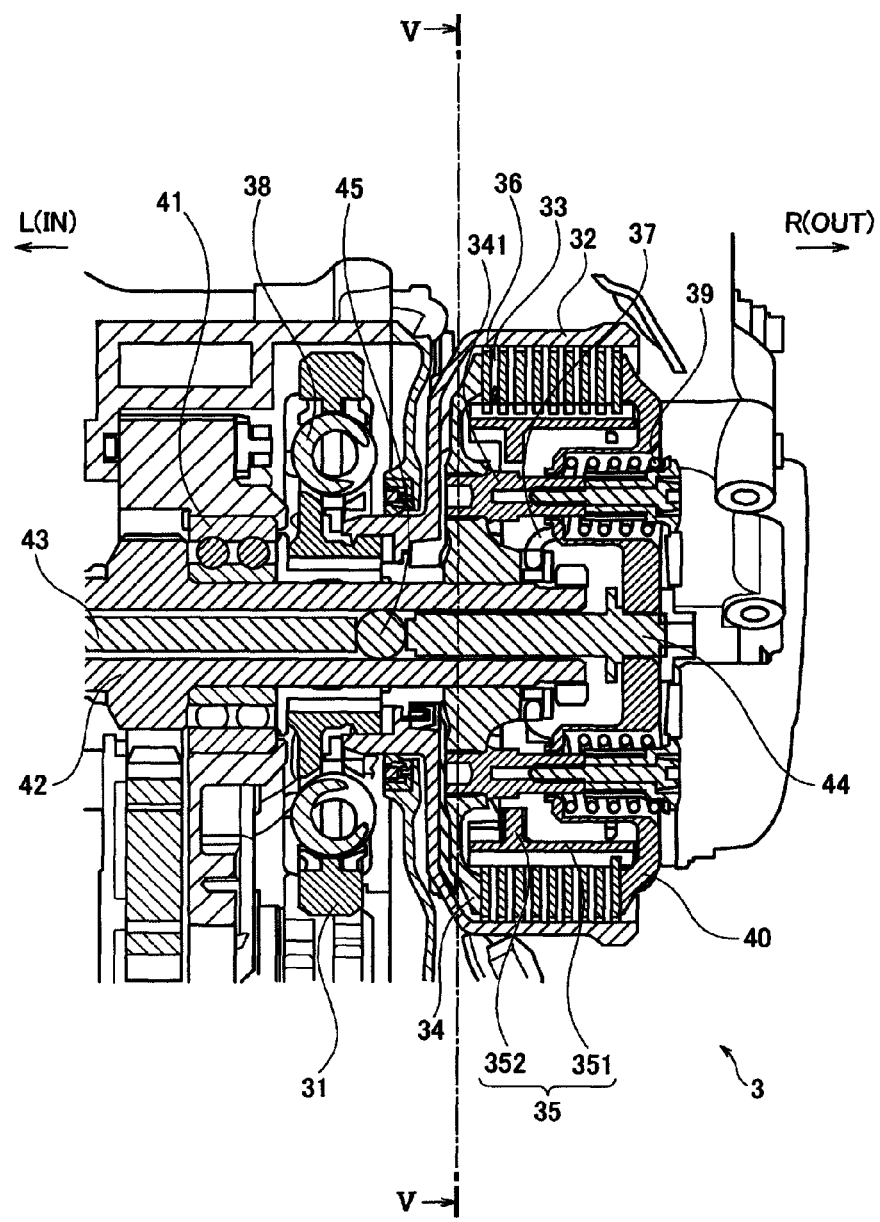
FIG. 3 is a cross-sectional view schematically illustrating an example of an internal structure of a clutch, and is an enlarged view of a III portion in FIG. 2.

Next, the whole structure of the clutch 3 will be described referring to FIG. 3. FIG. 3 is a cross-sectional view schematically illustrating an example of an internal structure of the clutch 3, and is an enlarged view of a III portion in FIG. 2.

The clutch 3 is provided in the engine unit 14 of the motorcycle 1, and connects and disconnects the rotary motive power between the crankshaft 211 (namely, a driving force source) and the counter shaft 42 (namely, the output shaft). The clutch 3 further includes the back torque limiter 7 according to the embodiment of the present invention. The back torque limiter 7 reduces the back torque from the counter shaft to the crankshaft 211 when the number of rotations of the counter shaft is a predetermined value or more. Note that the structure of the back torque limiter 7 will be described later. Further, for convenience of the description, an "axial direction", a "radial direction", and a "circumferential direction" which are simply referred to in the following description mean the axial direction, the radial direction, and the circumferential direction (rotation direction) of the counter shaft 42 unless otherwise noted.

The clutch 3 is provided near an end portion on the right side in the vehicle width direction of the counter shaft 42. The clutch 3 is constituted by including the primary driven gear 31, a clutch housing 32, a clutch sleeve 35, a clutch hub 34, a drive plate 33, a driven plate 36, a pressure disk 40, and a support disk 37.

The primary driven gear 31 engages with the primary drive gear 212 provided on the crankshaft 211, and rotates by the rotary motive power of the crankshaft 211 (namely, the rotary motive power of the driving force source) transmitted thereto. The primary driven gear 31 is disposed coaxially with the counter shaft 42. Further, the primary driven gear 31 is relatively rotatably supported on the counter shaft 42.

The clutch housing 32 is arranged on the outside in the vehicle width direction (on the right side in the vehicle width direction in the embodiment of the present invention) of the primary driven gear 31. The clutch housing 32 is arranged coaxially with the counter shaft 42, similarly to the primary driven gear 31, and relatively rotatably supported on the counter shaft 42. The clutch housing 32 has a cup-shaped structure which is substantially hollow therein and opens on the outside in the vehicle width direction being the axial direction. Further, the clutch housing 32 is arranged such that a side thereof corresponding to a bottom surface of the cup is directed toward a side of the primary driven gear (the center side in the vehicle width direction). Note that a part corresponding to the bottom surface of the cup is formed with a through hole passing therethrough in the axial direction, and an end portion in the vehicle width direction of the counter shaft 42 (a right side end portion) enters into an inner peripheral side of the clutch housing 32 through the through hole. On an inner peripheral surface of the clutch housing 32, a plurality of ring-shaped and plate-shaped drive plates 33 are attached side by side at predetermined intervals in the axial direction. The plurality of drive plates 33 integrally rotate with the clutch housing 32, and are movable relative to the clutch housing 32 in the axial direction.

Then, the clutch housing 32 is coupled to the primary driven gear 31 via a damper mechanism and basically rotates integrally with the primary driven gear 31. The damper mechanism has a plurality of first biasing members 38. To the first biasing members 38, a required number of compression coil springs are applied. The compression coil springs as the first biasing members 38 are provided, in a direction in which the compression coil springs are capable of elastic compression deformation in a circumferential direction of the primary driven gear 31 and the clutch housing 32, to spread across the primary driven gear 31 and the clutch housing 32. Therefore, the primary driven gear 31 and the clutch housing 32 basically integrally rotate, and are relatively movable to some extent in the circumferential direction by the elastic compression deformation of the first biasing members 38.

The clutch hub 34 is provided coaxially with the counter shaft 42 and rotates integrally with the counter shaft 42. The clutch hub 34 has, for example, a disk-shaped structure. Further, the clutch hub 34 is arranged on the inner peripheral side of the clutch housing 32. More specifically, the clutch hub 34 is arranged near the bottom surface of the cup-shaped clutch housing 32 (namely, in a manner to be closer to the outside in the vehicle width direction on the bottom surface of the cup-shaped clutch housing 32). Further, the clutch hub 34 is provided with stoppers 342 and support parts 341 which are in a rod shape or cylindrical shape projecting toward the outside in the vehicle width direction (later described).

The clutch sleeve 35 transmits the rotary motive power transmitted from the clutch housing 32 to the counter shaft 42 via the clutch hub 34. The clutch sleeve 35 is provided coaxially with the clutch hub 34 and the counter shaft 42 on the outside in the vehicle width direction of the clutch hub 34. Further, the clutch sleeve 35 basically rotates integrally with the clutch hub 34 and the counter shaft 42. However, the clutch sleeve 35 is allowed to move to some extent in the axial direction and the circumferential direction relative to the clutch hub 34.

The clutch sleeve 35 has a main body part 351 and an inner part 352. The main body part 351 is formed in a cylindrical shape. On an outer peripheral surface of the main body part 351, a plurality of ring-shaped and plate-shaped driven plates 36 are provided side by side in the axial direction. The plurality of driven plates 36 rotate integrally with the clutch sleeve 35, and are movable relative to the main body part 351 of the clutch sleeve 35 in the axial direction. The plurality of driven plates 36 provided on the main body part 351 of the clutch sleeve 35 and the plurality of drive plates 33 provided on the clutch housing 32 are arranged so as to alternately intervene in the axial direction. The inner part 352 has a structure in a ring shape and a rib shape projecting toward the center side in the radial direction from an inner peripheral surface of the main body part 351. The inner part 352 is formed integrally with the main body part 351 at a position closer to the center side in the vehicle width direction of the main body part 351 (in particular, near an end portion on the center side in the vehicle width direction). On an inner peripheral surface 353 of the inner part 352, an abutment part 354 is provided which abuts against the stopper 342 provided on the clutch hub 34 (described later).

On the outside in the vehicle width direction of the clutch hub 34, the drive plates 33, and the driven plates 36, the pressure disk 40 is provided to cover the opening of the clutch housing 32. The pressure disk 40 is arranged coaxially with the clutch hub 34 and the counter shaft 42. The pressure disk 40 rotates integrally with the counter shaft 42 and the clutch hub 34. However, the pressure disk 40 is provided to be movable in the axial direction relative to the counter shaft 42 and the clutch hub 34. The pressure disk 40 biases the drive plates 33 and the driven plates 36 by a biasing force of a second biasing member 39 so as to bring the drive plates 33 and the driven plates 36 into contact with each other at a required pressure. Specifically, this is as follows. At a plurality of places of the clutch hub 34, support parts 341 are provided. The support parts 341 have a structure in a rod shape or a cylindrical shape projecting toward the outside in the vehicle width direction. Tip portions (end portions on the outside in the vehicle width direction) of the support parts 341 pass through a through hole formed in the pressure disk 40 and project to the outside in the vehicle width direction of the pressure disk 40. Between the tip portion of each of the support parts 341 and the pressure disk 40, a compression-deformable coil spring being an example of the second biasing member 39 is installed in a state of being elastically compression-deformed to some extent. Therefore, the pressure disk 40 is biased to the center side in the vehicle width direction (namely, to the clutch hub 34) by the biasing force of the second biasing member 39 (compression-deformable coil spring). Accordingly, the drive plates 33 and the driven plates 36 are biased by the pressure disk 40 and brought into contact with each other in state that a required pressure is applied thereto.

The counter shaft 42 is rotatably supported on the casing of the crankcase assembly 2 by bearings. The positions and number of the bearings are not particularly limited, but the bearing 41 provided on the most right side in the vehicle width direction is preferably structured to be provided on the center side in the vehicle width direction of and adjacent as close as possible to the primary driven gear 31. With such a structure, it is possible to reduce the length of a portion of the counter shaft 42 projecting to the outside in the vehicle width direction (the right side in the embodiment of the present invention) from this bearing 41. The counter shaft 42 is a hollow shaft. Inside the counter shaft 42, a push rod 43 is disposed to be reciprocatable in the axial direction. On a right side end portion of the counter shaft 42 and the push rod 43, a pressing member 44 is provided via a spherical body 45 such as a steel ball. The pressing member 44 is pushed by the push rod 43 to move to the right side (the outside in the vehicle width direction) to thereby press the pressure disk 40 to the outside in the vehicle width direction. Further, on a left side end portion of the push rod 43, a required mechanism is provided (not illustrated) for moving the push rod 43 to the right side in the axial direction according to the operation of the clutch lever.

(Basic Operation of Clutch)

Here, the basic operation of the clutch 3 will be described. In a state that the clutch lever is not operated, the pressure disk 40 and the clutch hub 34 hold the drive plates 33 and the driven plates 36 by the biasing force of the second biasing member 39. Thus, the drive plates 33 and the driven plates 36 come into contact with each other in a state that a pressure is applied in the axial direction. In this state, the rotary motive power transmitted from the primary driven gear 31 to the clutch housing 32 is transmitted to the counter shaft 42 via the drive plates 33, the driven plates 36, the clutch sleeve 35, and the clutch hub 34. Therefore, a so-called "clutch engaged" state is established.

When the clutch lever is operated, the push rod 43 is moved to the right side in the vehicle width direction by the not-illustrated mechanism. Then, the push rod 43 presses the pressure disk 40 toward the right side (the outside in the vehicle width direction) via the spherical body 45 and the pressing member 44. This moves the pressure disk 40 to the outside in the vehicle width direction against the biasing force of the second biasing member 39. Then, the biasing force (the biasing force to the center side in the vehicle width direction) applied by the pressure disk 40 to the drive plates 33 and the driven plates 36 weakens or disappears. Therefore, the pressure between the drive plates 33 and the driven plates 36 weakens or disappears, so that the rotary motive power transmitted between them weakens or the rotary motive power is not transmitted between them any longer. Therefore, a so-called "half clutch" state or a "clutch disengaged" state is established.

As described above, the clutch 3 can alternately shift between a state that the pressure disk 40 applies the biasing force to the drive plates 33 and the driven plates 36 and a state that it does not apply. This makes it possible to connect and disconnect the rotary motive power from the crankshaft 211 to the counter shaft 42. Note that the above structure is one example, and the structure of the clutch 3 is not limited to this structure. The clutch 3 only needs to have a structure capable of switching between the "clutch engaged" state, and, the "half clutch" state and the "clutch disengaged" state by the pressure disk 40 moving in the axial direction. Further, the example that the clutch 3 is a multiplate type clutch having the plurality of drive plates 33 and driven plate 36 is illustrated in the embodiment of the present invention, but the clutch 3 is not limited to the multiplate type clutch.

(Structure of Back Torque Limiter)

Next, an example of the structure of the back torque limiter 7 will be described. In the case where back torque is applied to the counter shaft 42, the back torque limiter 7 reduces the back torque when the number of rotations of the counter shaft 42 is the predetermined value or more, and does not reduce the back torque when the number of rotations of the counter shaft 42 is less than the predetermined value. The back torque limiter 7 is constituted by including the stopper 342 provided at the clutch hub 34, a restricting member 6, and a third biasing member 75 (see FIG. 4), and a first cam 71 provided at the clutch hub 34 and a second cam 72 provided at the clutch sleeve 35 (see FIG. 8). Further, the main body part 351 and the inner part 352 of the clutch sleeve 35 also constitute the back torque limiter 7. When the number of rotations of the counter shaft 42 being the example of the output shaft of the clutch 3 is less than the predetermined value, the restricting member 6 and the third biasing member 75 serve as a restricting means that restricts movement of the pressure disk 40 in a direction away from the clutch hub 34.

Figure 4:
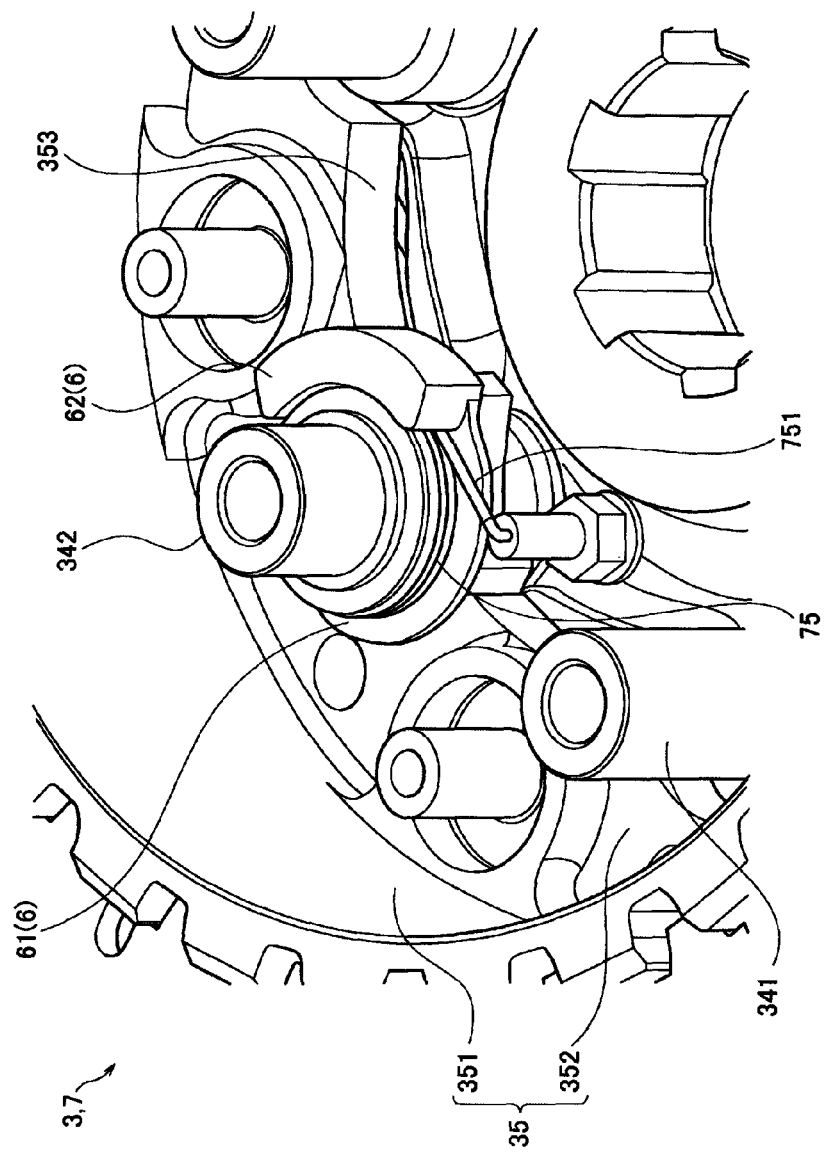
FIG. 4 is a perspective view schematically illustrating a stopper and a restricting member which constitute a back torque limiter.
Figure 5:
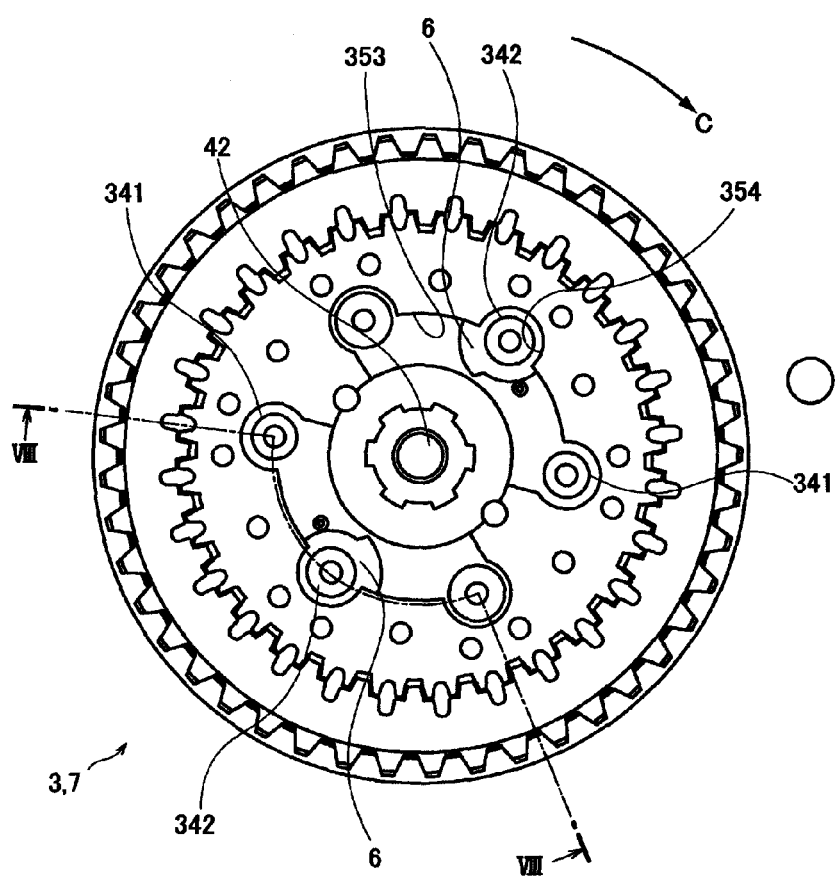
FIG. 5 is a view schematically illustrating the structure of the clutch, and is a view viewed from arrows of a cross section taken along a line V-V in FIG. 3.

FIG. 4 is a perspective view schematically illustrating the stopper 342 and the restricting member 6 which constitute the back torque limiter 7. Note that in FIG. 4, the support disk 37 and the pressure disk 40 are omitted for the description. FIG. 5 is a view schematically illustrating the structure of the clutch 3, and is a view viewed from arrows of a cross section taken along a line V-V in FIG. 3. Note that an arrow C in FIG. 5 indicates the rotation direction (hereinafter, described as a forward rotation direction C) of the counter shaft 42, the clutch hub 34, and the clutch sleeve 35 when the motorcycle 1 moves forward.

As illustrated in FIG. 4 and FIG. 5, the clutch hub 34 is provided with a plurality of stoppers 342 at positions away in the radial direction from the rotation center of the counter shaft 42. The stopper 342 has a structure in a columnar shape or a cylindrical shape projecting from the clutch hub 34 toward the outside in the vehicle width direction (the side of the clutch sleeve 35). Here, an example that two cylindrical stoppers 342 are provided at the clutch hub 34 will be illustrated. Each of the stoppers 342 is provided with the restricting member 6 which is rotatable with respect to the stopper 342 and is biased in a predetermined direction by the third biasing member 75. Further, as illustrated in FIG. 5, on the inner peripheral surface 353 of the inner part 352 of the clutch sleeve 35, the abutment part 354 is provided against which the restricting member 6 or the stopper 342 can abut. For example, the inner part 352 of the clutch sleeve 35 is formed with a recessed portion as the abutment part 354 at a position corresponding to the stopper 342. Here, an example that the abutment part 354 is formed in an arc shape having an inner diameter larger than the outer diameter of the stopper 342 will be illustrated. Further, a portion on the outer peripheral side of the stopper 342 enters the recessed portion being the abutment part 354. Further, between the stopper 342 and the abutment part 354, a clearance is formed in the circumferential direction (the rotation direction). Note that though the structure in which the clearance is formed both on the front and rear in the forward rotation direction C of the stopper 342 is illustrated in FIG. 5, the clearance only needs to be formed at least on the front side in the forward rotation direction C of the stopper 342. Therefore, the clutch sleeve 35 is movable (rotatable) in the circumferential direction relative to the clutch hub 34. Note that the above structure is an example of the abutment part 354, and the abutment part 354 is not limited to such a structure. For example, the shape of the abutment part 354 is not limited to the arc shape.

Then, the restricting member 6 provided at the stopper 342 switches between the state that the clutch hub 34 and the clutch sleeve 35 are relatively movable in the circumferential direction and the state that they are not movable. Concretely, when the number of rotations of the counter shaft 42 is the predetermined value or more, the restricting member 6 switches over to the state that the clutch sleeve 35 can rotate relative to the clutch hub 34. On the other hand, when the number of rotations of the counter shaft 42 is less than the predetermined value, the restricting member 6 switches over to the state that the clutch sleeve 35 cannot rotate relative to the clutch hub 34.

Figure 6A:
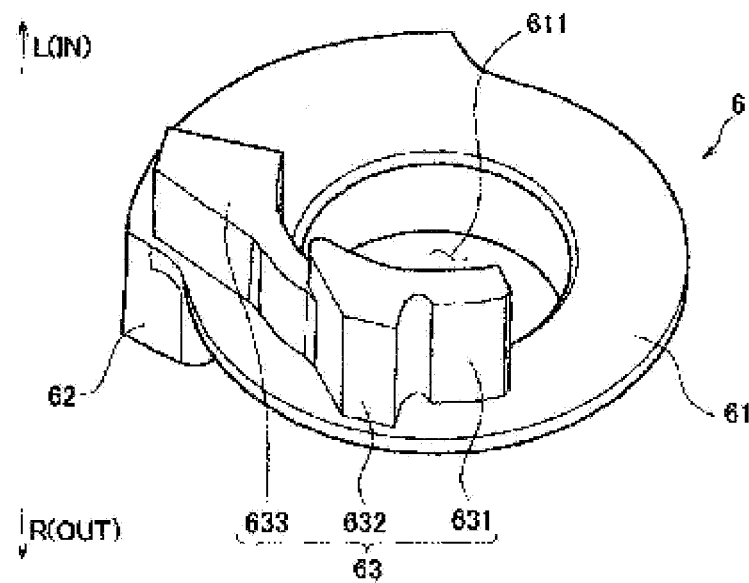
FIG. 6A is an external perspective view schematically illustrating an example of a structure of a restricting member.
Figure 6B:
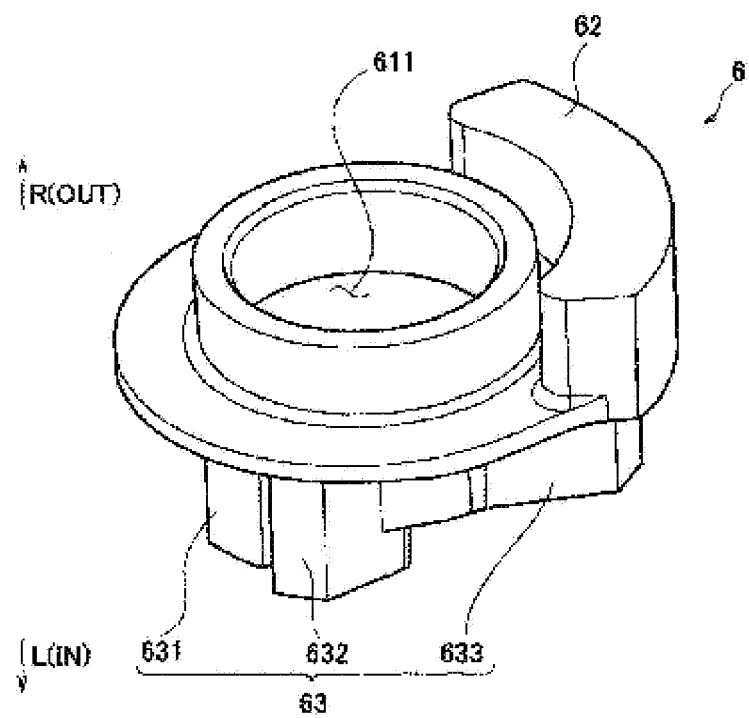
FIG. 6B is an external perspective view schematically illustrating the example of the structure of the restricting member.

Here, the structure of the restricting member 6 will be described referring to FIG. 6A and FIG. 6B. FIG. 6A and FIG. 6B are external perspective views schematically illustrating an example of the structure of the restricting member 6. Note that FIG. 6A is a perspective view of the restricting member 6 as viewed from the center side in the vehicle width direction, and FIG. 6B is a perspective view of the restricting member 6 as viewed from the outside in the vehicle width direction. As illustrated in FIG. 6A and FIG. 6B, the restricting member 6 includes a main body part 61, a weight part 62, and a restricting part 63. The main body part 61 is formed with a through hole 611 passing therethrough in the vehicle width direction (the axial direction). The through hole 611 is formed to allow the stopper 342 to pass therethrough. The restricting part 63 has a structure in a block shape projecting from the main body part 61 to the center side in the vehicle width direction. The restricting part 63 further has an insertion part 631, a locking part 632, and an inhibiting part 633. The insertion part 631 is formed in a dimension and a shape with which the insertion part 631 can enter the clearance between the stopper 342 and the abutment part 354. More specifically, a radial direction dimension of the insertion part 631 (here, meaning not the dimension in the radial direction of the counter shaft 42 but the dimension in the radial direction of the through hole 611 of the restricting member 6) is formed to be almost the same as or smaller than that of the above-described clearance. On the other hand, the locking part 632 is formed in a dimension and a shape with which the locking part 632 cannot enter the above-described clearance. More specifically, a radial direction dimension of the locking part 632 (here, meaning the dimension in the radial direction of the through hole 611 of the restricting member 6) is formed to be larger than the maximum value of the above-described clearance. The inhibiting part 633 is formed at a position where when the restricting member 6 rotates by a predetermined angle and the insertion part 631 gets out of the above-described clearance, the inhibiting part 633 abuts against the inner peripheral surface of the inner part 352 of the clutch sleeve 35. Therefore, the inhibiting part 633 is formed in a dimension and a shape with which the inhibiting part 633 cannot enter a clearance opposite the clearance which is the clearance between the stopper 342 and the abutment part 354 and which the insertion part 631 enters. The weight part 62 has a structure in a block shape projecting from the main body part 61 of the restricting member 6 toward the outside in the vehicle width direction.

Figure 7A:
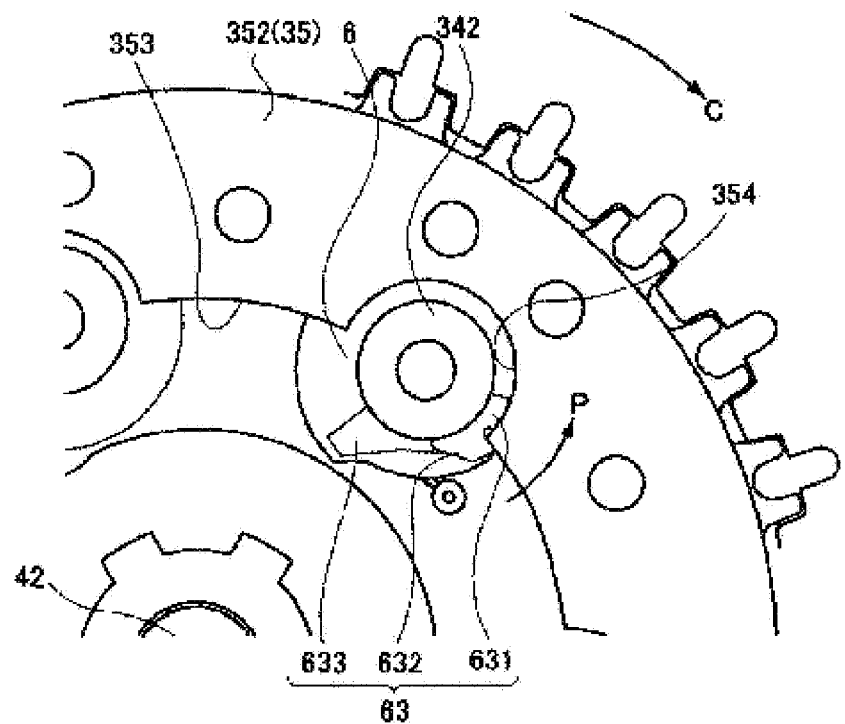
FIG. 7A is a view viewed in an axial direction, schematically illustrating the relationship between the restricting member and an inner part of a clutch sleeve.
Figure 7B:
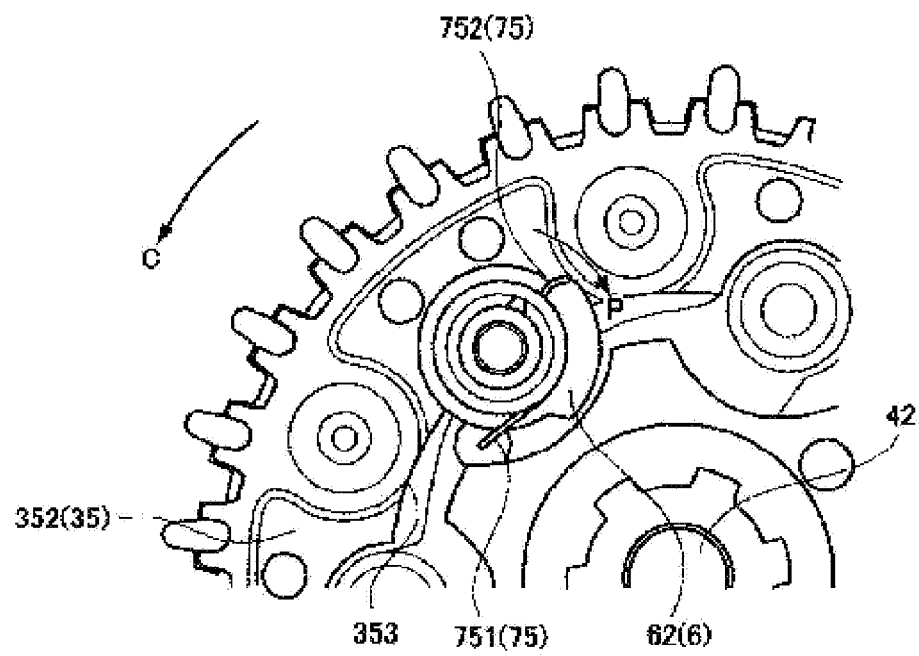
FIG. 7B is a view viewed in an axial direction, schematically illustrating the relationship between the restricting member and the inner part of the clutch sleeve.

Here, the relationship between the restricting member 6 and the inner part 352 of the clutch sleeve 35 will be described. FIG. 7A and FIG. 7B are views viewed in an axial direction, schematically illustrating the relationship between the restricting member 6 and the inner part 352 of the clutch sleeve 35. Note that FIG. 7A is a view of the inner part 352 and the restricting member 6 as viewed from the center side in the vehicle width direction. FIG. 7B is a view of the inner part 352 and the restricting member 6 as viewed from the outside in the vehicle width direction. The restricting member 6 is biased by the third biasing member 75. An arrow P in the drawings indicate a direction of the biasing force by the third biasing member 75. For example, a torsion coil spring is applied to the third biasing member 75. Further, a main body part (a cylindrical portion) of the torsion coil spring is mounted to be wound around the outside of the main body part 61 of the restricting member 6. One arm 751 of the torsion coil spring is attached to the clutch hub 34, and another arm 752 is hooked on the weight part 62. In the state that force other than the biasing force of the third biasing member 75 is not applied to the restricting member 6, the insertion part 631 being a part of the restricting member 6 enters the clearance between the stopper 342 and the abutment part 354 by the biasing force of the third biasing member 75, so that the locking part 632 is kept in a state of abutting against the inner peripheral surface 353 of the inner part 352 of the clutch sleeve 35. Then, in this state, as illustrated in FIG. 7B, the weight part 62 is located not at the outermost side in the radial direction but at a position displaced from the outermost side to the center side in the radial direction. As described above, the restricting member 6 is biased so that the insertion part 631 being a part of the restricting member 6 enters the clearance between the stopper 342 and the abutment part 354 by the third biasing member 75 and the weight part 62 is located at the position displaced from the outermost side to the center side in the radial direction. In this state, the insertion part 631 enters the clearance between the stopper 342 and the abutment part 354, and therefore the clutch hub 34 is brought into a state of being incapable of moving in the forward rotation direction C relative to the clutch sleeve 35.

When the clutch hub 34 rotates together with the counter shaft 42, a centrifugal force is applied to the weight part 62 of the restricting member 6. When the number of rotations of the counter shaft 42 becomes the predetermined value or more and the centrifugal force on the weight part 62 becomes larger than the biasing force of the third biasing member 75, the restricting member 6 rotates, against the biasing force of the third biasing member 75, in a direction in which the weight part 62 moves to the outside in the radial direction of the clutch hub 34 and the clutch sleeve 35 (in the opposite direction to the direction P of the biasing force of the third biasing member 75). When the restricting member 6 rotates in the opposite direction to the biasing force of the third biasing member 75, the insertion part 631 gets out of the clearance between the stopper 342 and the abutment part 354. Therefore, the clutch hub 34 becomes a state of being movable in the forward rotation direction C relative to the clutch sleeve 35.

Further, when the restricting member 6 rotates by a predetermined angle, the inhibiting part 633 abuts against the inner peripheral surface of the inner part 352 of the clutch sleeve 35, thereby limiting the rotation of the restricting member 6. Note that the "predetermined value" of the number of rotations of the counter shaft 42 means the number of rotations with which the centrifugal force of the weight part 62 becomes larger than the biasing force of the third biasing member 75 and the restricting member 6 rotates against the biasing force of the third biasing member 75. The predetermined value can be appropriately set by adjusting the mass of the weight part 62, the distance from the rotation center of the clutch hub 34, or the biasing force of the third biasing member 75. In the embodiment of the present invention, the predetermined value is set to the number of rotations in an idling state of the engine unit 14.

Figure 8:
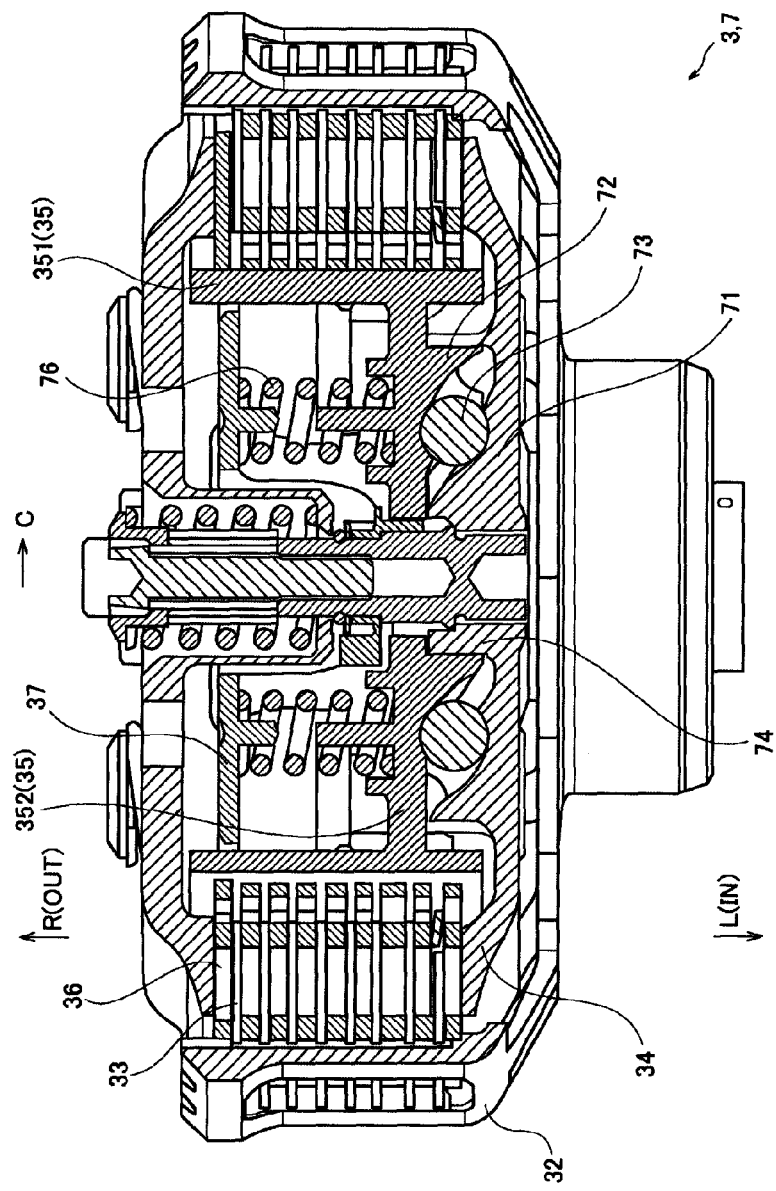
FIG. 8 is a cross-sectional view schematically illustrating the structure of the clutch, and is a view viewed from arrows of a cross section taken along a line VIII-VIII in FIG. 5.

In addition to the above, the clutch hub 34 and the clutch sleeve 35 are provided with a mechanism for transmitting the rotary motive power from the clutch sleeve 35 to the clutch hub 34. Further, as a mechanism constituting the back torque limiter 7, a mechanism for moving the pressure disk 40 toward the outside in the vehicle width direction when back torque is applied. Here, these mechanisms will be described referring to FIG. 8. FIG. 8 is a cross-sectional view schematically illustrating the structure of the clutch 3 and is a view viewed from arrows of a cross section taken along a line VIII-VIII in FIG. 5. On a surface on the outside in the vehicle width direction of the clutch hub 34 (a surface on a side facing the inner part 352 of the clutch sleeve 35), the first cam 71 and an engaging part 74 are provided. On the other hand, on a surface on the center side in the vehicle width direction of the inner part 352 of the clutch sleeve (a surface on a side facing the clutch hub 34), the second cam 72 is provided. Further, between the first cam 71 and the second cam 72, a spherical body 73 such as a steel ball is provide to intervene between them. Each of the first cam 71 and the second cam 72 is a three-dimensional cam in a inclined surface shape inclining along the circumferential direction, and has a structure, for example, made by extracting a part of an end cam in a cylindrical shape. Note that the first cam 71 is formed into a descending slope (decreasing in height from the surface on the outside in the vehicle width direction of the clutch hub 34) to the front side in the forward rotation direction C of the counter shaft (see FIG. 7A and FIG. 7B). On the other hand, the second cam 72 is formed into an ascending slope (increasing in height from the surface on the center side in the vehicle width direction of the inner part 352 of the clutch sleeve 35) to the front side in the forward rotation direction C of the counter shaft 42. The engaging part 74 has a structure in a block shape projecting toward the outside in the vehicle width direction. The first cam 71 and the engaging part 74 of the clutch hub 34 are provided side by side in the circumferential direction (rotation direction), and the first cam 71 is located on the rear side in the forward rotation direction C of the counter shaft 42 and the engaging part 74 is located on the front side in the forward rotation direction C. Further, the second cam 72 of the clutch sleeve 35 is located between the first cam 71 and the engaging part 74 of the clutch hub 34.

Further, between the inner part 352 of the clutch sleeve 35 and the pressure disk 40, the support disk 37 is provided. The support disk 37 rotates integrally with the clutch sleeve 35. Further, the support disk 37 cannot move in the axial direction with respect to the clutch sleeve 35. For example, the support disk 37 is coaxially attached on the right side end portion of the counter shaft 42 (see FIG. 3). Further, between the support disk 37 and the inner part 352 of the clutch sleeve 35, fourth biasing members 76 are provided. To the fourth biasing members 76, for example, compression elastic deformable coil springs are applied. Then, the coil springs are provided, in a state of being compression-elastically deformed to some extent and with a direction of compression elastic deformation in parallel to the axial direction, to spread across the support disk 37 and the inner part 352 of the clutch sleeve 35. Therefore, the clutch sleeve 35 is biased by the fourth biasing members 76 toward the center side in the vehicle width direction, and the second cam 72 is kept in a state of being pressed against the first cam 71 of the clutch hub 34 via the spherical body 73.

According to the above structure, when the rotary motive power is transmitted from the clutch housing 32 to the clutch sleeve 35, a side surface of the second cam 72 of the clutch sleeve 35 abuts against a side surface of the engaging part 74 of the clutch hub 34. Therefore, the clutch hub 34 is pushed by the second cam 72 of the clutch sleeve 35 and thereby rotates to transmit the rotary motive power to the counter shaft 42. On the other hand, when back torque is applied to the clutch hub 34, the first cam 71 presses the second cam 72 via the spherical body 73. Therefore, the clutch sleeve 35 is pressed toward the outside in the vehicle width direction by the actions of the first cam 71 and the second cam 72.

(Operation of Back Torque Limiter)

Figure 9A:
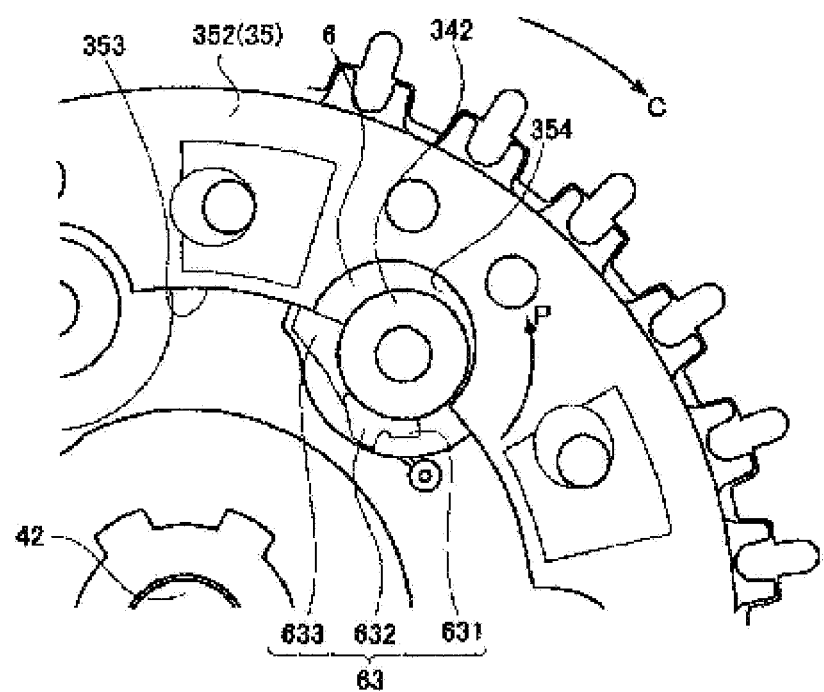
FIG. 9A is a schematic view illustrating a state of a clutch hub and the clutch sleeve when back torque is applied in the case where the number of rotations of a counter shaft is a predetermined value or more.
Figure 9B:
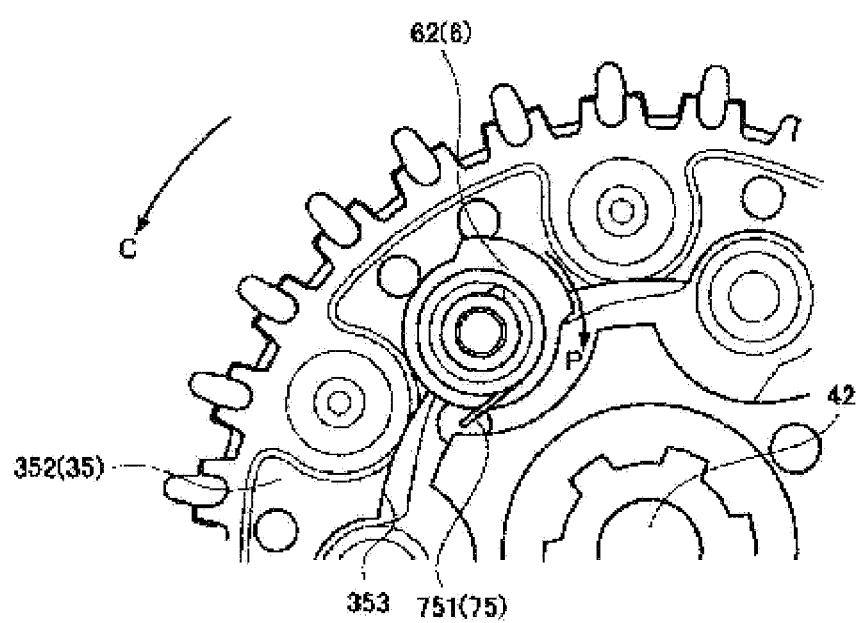
FIG. 9B is a schematic view illustrating the state of the clutch hub and the clutch sleeve when back torque is applied in the case where the number of rotations of the counter shaft is the predetermined value or more.
Figure 10:
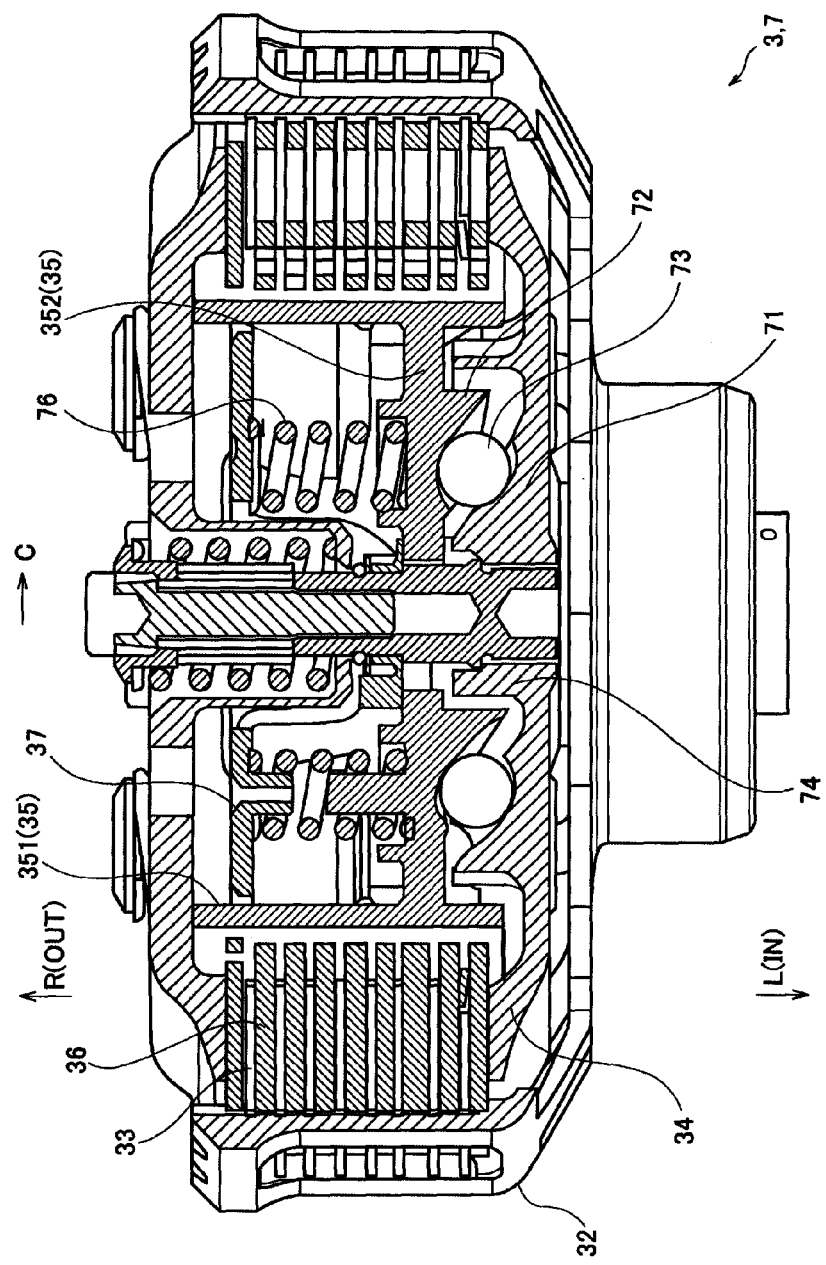
FIG. 10 is a schematic view illustrating a state of the clutch hub, the clutch sleeve, and a pressure disk when back torque is applied in the case where the number of rotations of the counter shaft is the predetermined value or more.

(a) In the Case where the Number of Rotations of the Counter Shaft is the Predetermined Value or More FIG. 9A and FIG. 9B are schematic views illustrating a state of the clutch hub 34, the clutch sleeve 35, and the restricting member 6 when back torque is applied in the case where the number of rotations of the counter shaft 42 is the predetermined value or more. Note that FIG. 9A and FIG. 9B are views corresponding to FIG. 7A and FIG. 7B respectively. FIG. 10 is a schematic view illustrating a state of the clutch hub 34, the clutch sleeve 35, and the pressure disk 40 when back torque is applied in the case where the number of rotations of the counter shaft 42 is the predetermined value or more. FIG. 10 is a view corresponding to FIG. 8. In this case, the centrifugal force applied on the weight part 62 of the restricting member 6 becomes larger than the biasing force of the third biasing member 75. Therefore, as illustrated in FIG. 9A and FIG. 9B, the restricting member 6 rotates in the opposite direction to the biasing force (a direction of an arrow P) of the third biasing member 75. Then, the insertion part 631 of the restricting part 63 of the restricting member 6 gets out of the clearance between the stopper 342 and the abutment part 354. Thus, the clutch hub 34 and the clutch sleeve 35 become a state of being relatively movable in the rotation direction. Note that when the restricting member 6 rotates in the opposite direction to the biasing force of the third biasing member 75 by a predetermined angle, the inhibiting part 633 abuts against the inner peripheral surface of the inner part 352 of the clutch sleeve 35. Therefore, the restricting member 6 is restricted from further rotating. When back torque is applied on the clutch hub 34 in this state, the clutch hub 34 moves in the forward rotation direction C relative to the clutch sleeve 35 as illustrated in FIG. 9 and FIG. 10. Thus, as illustrated in FIG. 10, the first cam 71 presses the second cam 72 via the spherical body 73. Then, the clutch sleeve 35 moves toward the outside in the vehicle width direction against the biasing force of the fourth biasing member 76 by the actions of the first cam 71 and the second cam 72, and presses the pressure disk 40 toward the outside in the vehicle width direction against the biasing force of the second biasing member 39. Therefore, the pressure disk 40 reduces the biasing force (the biasing force by the second biasing member 39) biasing the drive plates 33 and the driven plates 36, resulting in the "half clutch" state or the "clutch disengaged" state. Accordingly, the back torque transmitted to the crankshaft 211 is reduced.

(b) In the Case where the Number of Rotations of the Counter Shaft is Less than the Predetermined Value In this case, the restricting member 6 is kept in a state that the insertion part 631 enters the clearance between the stopper 342 and the abutment part 354 by the biasing force of the third biasing member 75 (see FIG. 7). In this state, the clutch hub 34 cannot move in the forward rotation direction C relative to the clutch sleeve 35. When back torque is applied on the clutch hub 34 in this state, the clutch sleeve 35 is pushed by the stopper 342 via the insertion part 631 of the restricting member 6, and rotates integrally with the clutch hub 34 without relatively moving in the rotation direction. Then, the second cam 72 is not pressed by the first cam 71 and therefore does not move toward the outside in the vehicle width direction nor press the pressure disk 40 toward the outside in the vehicle width direction (see FIG. 8). Accordingly, the biasing force of the pressure disk 40 biasing the drive plates 33 and the driven plates 36 does not decrease, so that the back torque is transmitted to the crankshaft 211 without reduction.

As described above, the back torque limiter 7 reduces the back torque when the number of rotations of the counter shaft 42 is the predetermined value or more, and does not reduce the back torque when it is less than the predetermined value. The above structure reduces the back torque, in the case of shift down during running, to prevent the behavior of the vehicle body of the motorcycle 1 from being unstable. On the other hand, at the time of push starting from a vehicle stop state, the back torque from the rear wheel 132 is transmitted to the crankshaft 211 without reduction, thereby making it possible to start the engine unit 14.

The "predetermined value" of the number of rotations of the counter shaft 42 means the number of rotations with which the restricting member 6 rotates by the centrifugal force applied on the weight part 62 against the biasing force of the third biasing member 75 as described above. In other words, the "predetermined value" means the number of rotations with which the centrifugal force applied on the weight part 62 becomes larger than the biasing force of the third biasing member 75. When the centrifugal force applied on the weight part 62 becomes larger than the biasing force of the third biasing member 75, the restricting member 6 rotates in a direction in which the weight part 62 moves to the outside in the radial direction of the clutch hub 34. This predetermined value is set to the number of rotations of the counter shaft 42 when the engine unit 14 is in an idling rotation state. The "predetermined value" can be appropriately set by changing the mass of the weight part 62 or the biasing force of the third biasing member 75.

(Summary of Operation and Effect)

In the case where the number of rotations of the counter shaft 42 is the predetermined value or more, when back torque is applied on the counter shaft 42, the back torque limiter 7 reduces the back torque or makes it zero. Therefore, in the case of shift down during running, the back torque transmitted from the rear wheel 132 to the crankshaft 211 of the engine unit 14 is reduced or the back torque becomes zero. For example, if a sudden shift down is performed during running, engine brake impactively operates to momentarily generate large back torque. In such a case, the back torque limiter 7 reduces the back torque or makes it zero to prevent excessive back torque from being applied on the crankshaft 211. As a result, for example, engine brake is prevented from impactively operating to thereby stabilize the behavior of the motorcycle 1 during deceleration. Further, as the back torque applied on the clutch hub 34 via the counter shaft 42 is larger, the back torque limiter 7 can increase the degree of reduction of back torque. Therefore, it is possible to further stabilize the behavior of the motorcycle 1 during running at high speed.

On the other hand, when the number of rotations of the counter shaft 42 is the predetermined value or less, the back torque from the counter shaft 42 to the crankshaft 211 is not reduced. Accordingly, in the vehicle stop state, it is possible to start the engine unit 14 by a so-called "push starting" or the like.

As described above, the back torque limiter 7 can stabilize the behavior of the motorcycle 1 during running by reducing the back torque. On the other hand, in the case of "push starting", the back torque limiter 7 transmits the back torque to the crankshaft 211 of the engine unit 14 and thereby can start the engine unit 14. In particular, by applying the number of rotations during idling as the "predetermined value" of the number of rotations of the counter shaft 42, it is possible to start the engine unit 14 because the back torque is not reduced when "push starting". Then, the engine unit 14 is started into a state of idling rotation or a running state, the back torque is reduced or made zero.

Note that the "predetermined value" of the number of rotations of the counter shaft 42 is not particularly limited. The predetermined value is appropriately set, for example, according to the number of rotations of the counter shaft 42 required for starting the engine unit 14 by "push starting" and the number of rotations of the counter shaft 42 during idling or running. Further, the "predetermined value" can be appropriately set by changing the biasing force (spring coefficient) of the third biasing member 75 or the mass of the weight part 62.

Further, in the embodiment of the present invention, the restricting member 6 is provided at the clutch hub 34. Therefore, the distance from the bearing 41 provided on the most right side in the vehicle width direction to the restricting member 6 can be reduced. Accordingly, it is possible to reduce the mass of a portion away from the bearing 41 to thereby reduce the influence of a moment of the mass of the restricting member 6 applied on the counter shaft 42.

In the embodiment of the present invention, the clutch sleeve 35 provided between the clutch hub 34 and the pressure disk 40 is used to press the pressure disk 40 to the outside in the vehicle width direction and move it. In such a structure, it is unnecessary to provide a separate member for pressing the pressure disk 40, thereby simplifying the structure of the back torque limiter 7. In particular, it is possible to press the pressure disk 40 to the outside in the vehicle width direction and move it without complicating the structure while the restricting member 6 is provided at the clutch hub 34 (while it is provided on a side closer to the bearing 41 than the drive plates 33 and the driven plates 36).

Further, in the state that the back torque limiter 7 is operating, the accuracy of a position in the axial direction of the pressure disk 40 is strictly required. In the embodiment of the present invention, the back torque limiter 7 operates in a state that the insertion part 631 of the restricting member 6 is not inserted (namely, intervening) between the stopper 342 and the abutment part 354. According to such a structure, it is unnecessary to require high accuracy of the dimension of the restricting member 6, thus facilitating quality management and manufacture of the restricting member 6. It is also possible to reduce the manufacturing cost.

In the embodiment of the present invention, depending on the centrifugal force applied on the restricting member 6, the restricting member 6 switches between the state that the back torque limiter 7 operates and the state that it does not operate. Such a structure is a simple structure but can switch between the state that the back torque limiter 7 operates and the state that it does not operate according to the number of rotations of the counter shaft 42 that serves as the output shaft of the clutch 3. Further, using the number of rotations during idling as the "predetermined number of rotations" at which the state that the back torque limiter 7 operates and the state that it does not operate are switched, makes it possible to operate the back torque limiter 7 during running so as to stabilize the behavior of the vehicle body during deceleration and the like. On the other hand, when push starting, it is possible to transmit the back torque to the crankshaft 211 without operating the back torque limiter 7 so as to start the engine unit 14.

In the embodiment of the present invention, the restricting member 6 rotates to switch between the state that the back torque limiter 7 operates and the state that it does not operate. In such a structure, the restricting member 6 does not move in the axial direction nor the radial direction, and therefore never interferes with other members during operation. This never hinders the layout of the restricting member 6 and members thereabround.

(Other Embodiments)

Though the structure in which the restricting member 6 is rotatably provided at the clutch hub 34 is illustrated in the above embodiment, the restricting member 6 may be structured to be provided at the clutch sleeve 35. For example, the following structure may be adopted. A member corresponding to the stopper 342 is provided, at the inner part 352 of the clutch sleeve 35, to project toward the clutch hub 34 (the center side in the vehicle width direction). The restricting member 6 is attached to the member corresponding to the stopper 342 to be rotatable and in a state of being biased by the third biasing member 75 in a predetermined rotation direction. On the other hand, the clutch hub 34 is formed with an opening portion passing therethrough in the axial direction at a position corresponding to the member corresponding to the stopper 342 in a view in the axial direction, or formed with a recessed portion recessed toward the center side in the vehicle width direction in a surface on the outside in the vehicle width direction. Further, the member corresponding to the stopper 342 and the restricting member 6 are inserted into the opening portion or the recessed portion provided in the clutch hub 34. Here, a clearance is formed between the member corresponding to the stopper 342 and the opening portion or the recessed portion provided in the clutch hub 34. To the structure of the clearance, a structure similar to that in the above embodiment is applied. Therefore, a part of the opening portion or the recessed portion provided in the clutch hub 34 serves as the abutment part 354. Such a structure can provide the same effects as those in the above-described structure. As described above, the restricting member 6 may be structured to be provided at the clutch hub 34 or structured to be provided at the clutch sleeve 35.

In the foregoing, the embodiments of the present invention are described in detail, but the above-described embodiments only illustrate concrete examples in carrying out the present invention. The technical scope of the present invention is not limited to the above-described embodiments. Various changes can be made in the present invention within a range not departing from its spirit and these changes are also included in the technical scope of the present invention.

For example, the motorcycle illustrated in the embodiments of the present invention is merely an example of a motorcycle to which the clutch of the present invention is applicable. The present invention is also applicable to motorcycles other than the motorcycle described in the embodiments. Further, the present invention is not limited to motorcycles but is applicable also to clutches of four-wheeled vehicles. Furthermore, the multiplate type clutch is illustrated as the clutch in the embodiments, but the kind of the clutch is not limited.

Further, the structure in which the spherical body such as a steel ball intervenes between the first cam and the second cam is illustrated in the embodiments of the present invention, but a structure in which no spherical body intervenes between them may be adoptable. Namely, such a structure may be adoptable that the first cam and the second cam are in direct contact with each other to transmit the back torque. Such a structure can also perform the same operation as that in the embodiments and provide the same operation and effect.

INDUSTRIAL APPLICABILITY

The present invention is a technique effective to a back torque limiter of a clutch. According to the present invention, a restricting member can be provided at a position closer to the center from an end portion of an output shaft and thereby reduce the influence of a moment of the mass of the restricting member applied on the output shaft.

The invention claimed is:

1. A clutch with a back torque limiter, the clutch comprising:
 a housing which is provided with a drive plate to be movable in an axial direction and to which a rotary motive power is transmitted from a driving force source;
 a hub which transmits the rotary motive power to an output shaft;
 a sleeve which is provided with a driven plate to be movable in the axial direction and which transmits the rotary motive power from the housing to the hub when the driven plate is pressed against the drive plate; and
 a pressure disk which is movable in the axial direction and biases the drive plate and the driven plate toward the hub, and further comprising:
 a back torque limiter which moves the pressure disk in a direction away from the hub to reduce a biasing force on the drive plate and the driven plate when back torque is applied from the output shaft;
 a restricting apparatus which restricts movement of the pressure disk in the direction away from the hub when a number of rotations of the output shaft is less than a predetermined value, wherein;
 the hub and the sleeve are relatively movable in a rotation direction and the axial direction;
 the hub and the sleeve relatively move in the rotation direction when the back torque is applied from the output shaft;
 the back torque limiter moves the sleeve in the direction away from the hub according to the relative movement in the rotation direction of the hub and the sleeve, and brings the sleeve into abutment against the pressure disk to press the pressure disk to thereby move the pressure disk in the direction away from the hub;
 the hub is provided with a stopper which restricts the movement in the rotation direction relative to the sleeve;
 the sleeve is provided with an abutment part which abuts against the stopper when the sleeve rotates in the rotation direction relative to the hub, with a clearance in the rotation direction intervening between the abutment part and the stopper;
 the hub and the sleeve try to relatively rotate in a direction in which the clearance between the stopper and the abutment part decreases when the back torque is applied from the output shaft; and
 the restricting apparatus comprises a restricting member which restricts, when a part thereof enters the clearance, the relative movement in the rotation direction of the hub and the sleeve.

2. The clutch with a back torque limiter according to claim 1, wherein the part of the restricting member enters the clearance when the number of rotations of the output shaft is less than the predetermined value, and gets out of the clearance when the number of rotations of the output shaft is the predetermined value or more.

3. The clutch with a back torque limiter according to claim 2, wherein the restricting member switches between a state that the part thereof enters the clearance and a state that the part thereof gets out of the clearance, depending on a centrifugal force generated by rotation of the hub.

4. The clutch with a back torque limiter according to claim 1, wherein the restricting member is rotatably provided on the stopper.

* * * * *